(12) United States Patent
Lin

(10) Patent No.: US 11,199,269 B2
(45) Date of Patent: Dec. 14, 2021

(54) BOTTLE JACK WITH ADJUSTABLE VALVE INHIBITOR

(71) Applicant: PULL'R HOLDING COMPANY, LLC, Schaumburg, IL (US)

(72) Inventor: Mark Lin, Barrington, IL (US)

(73) Assignee: Pull'r Holding Company, LLC, Schaumburg, IL (US)

( * ) Notice: Subject to any disclaimer, the term of this patent is extended or adjusted under 35 U.S.C. 154(b) by 82 days.

(21) Appl. No.: 16/590,508

(22) Filed: Oct. 2, 2019

(65) Prior Publication Data
US 2020/0032914 A1 Jan. 30, 2020

Related U.S. Application Data

(62) Division of application No. 15/682,711, filed on Aug. 22, 2017, now Pat. No. 10,465,802.

(51) Int. Cl.
| | |
|---|---|
| *F16K 1/52* | (2006.01) |
| *F02M 61/16* | (2006.01) |
| *F16K 35/06* | (2006.01) |
| *F16K 35/02* | (2006.01) |

(52) U.S. Cl.
CPC ........... *F16K 1/523* (2013.01); *F02M 61/161* (2013.01); *F02M 61/168* (2013.01); *F16K 35/025* (2013.01); *F16K 35/06* (2013.01); *F02M 2200/8076* (2013.01)

(58) Field of Classification Search
CPC ........ F16K 1/523; F16K 35/025; F16K 35/06; F02M 61/161; F02M 61/168; F02M 2200/8076

USPC .................. 251/89–116, 284–288; 254/93 H
See application file for complete search history.

(56) References Cited

U.S. PATENT DOCUMENTS

| | | | | |
|---|---|---|---|---|
| 345,197 | A ‡ | 7/1886 | Wade | F16K 15/18 251/82 |
| 633,228 | A ‡ | 9/1899 | Cholodlowsky | B60T 7/124 246/170 |
| 904,329 | A ‡ | 11/1908 | Hohman | F16K 1/20 251/112 |
| 1,231,164 | A ‡ | 6/1917 | Jahns | F16K 35/10 137/384 |
| 1,689,236 | A * | 10/1928 | Fraser, Jr. | F16K 35/025 116/277 |

(Continued)

*Primary Examiner* — John Bastianelli
(74) *Attorney, Agent, or Firm* — Cherskov Flaynik & Gurda, LLC

(57) ABSTRACT

The invention provides a valve having an elongated main body and a substantially flat area defined within the valve between its first and second ends; wherein a stopping screw is received in said flat area so as to prevent extraction of the valve from a casing by applying a force against a portion of the valve once the valve is moved a predetermined number of turns. The invention also provides a method for inhibiting the turning of a valve having the steps of installing a threaded portion of a valve in a first threaded aperture through a casing, where the first threaded aperture receives the threads of the threaded portion of the valve; and threading a screw through a second threaded aperture in an exterior of the casing, where the screw, is disposed in a position to come into direct contact with the valve after a predetermined number of turns.

4 Claims, 9 Drawing Sheets

(56) References Cited

U.S. PATENT DOCUMENTS

| | | | | |
|---|---|---|---|---|
| 1,725,720 | A | ‡ | 8/1929 | Pedersen .................... B66F 3/26 |
| | | | | 254/93 H |
| 2,223,702 | A | ‡ | 12/1940 | Penick ..................... E21B 33/03 |
| | | | | 166/87.1 |
| 2,572,990 | A | ‡ | 10/1951 | Curtis ..................... F16K 31/58 |
| | | | | 251/112 |
| 2,970,609 | A | ‡ | 2/1961 | Beremand ............ G05D 7/0106 |
| | | | | 137/501 |
| 3,286,978 | A | ‡ | 11/1966 | Lansky .................... F16K 35/00 |
| | | | | 251/112 |
| 3,712,587 | A | * | 1/1973 | Specht .............. F16K 31/52408 |
| | | | | 251/285 |
| 4,356,996 | A | ‡ | 11/1982 | Linder .................... F16K 15/18 |
| | | | | 137/533.17 |
| 6,612,220 | B2 | * | 9/2003 | Niessen ................ F15B 15/065 |
| | | | | 251/285 |
| 6,994,312 | B2 | ‡ | 2/2006 | Pauer .................... F02M 61/168 |
| | | | | 251/12 |
| 8,033,525 | B2 | ‡ | 10/2011 | Wingett .................. F16K 1/523 |
| | | | | 251/12 |
| 8,490,947 | B2 | ‡ | 7/2013 | Grewal ..................... F16K 1/04 |
| | | | | 126/50 |
| 2009/0173925 | A1 | ‡ | 7/2009 | Turner ..................... B66F 3/24 |
| | | | | 254/93 H |

\* cited by examiner  
‡ imported from a related application

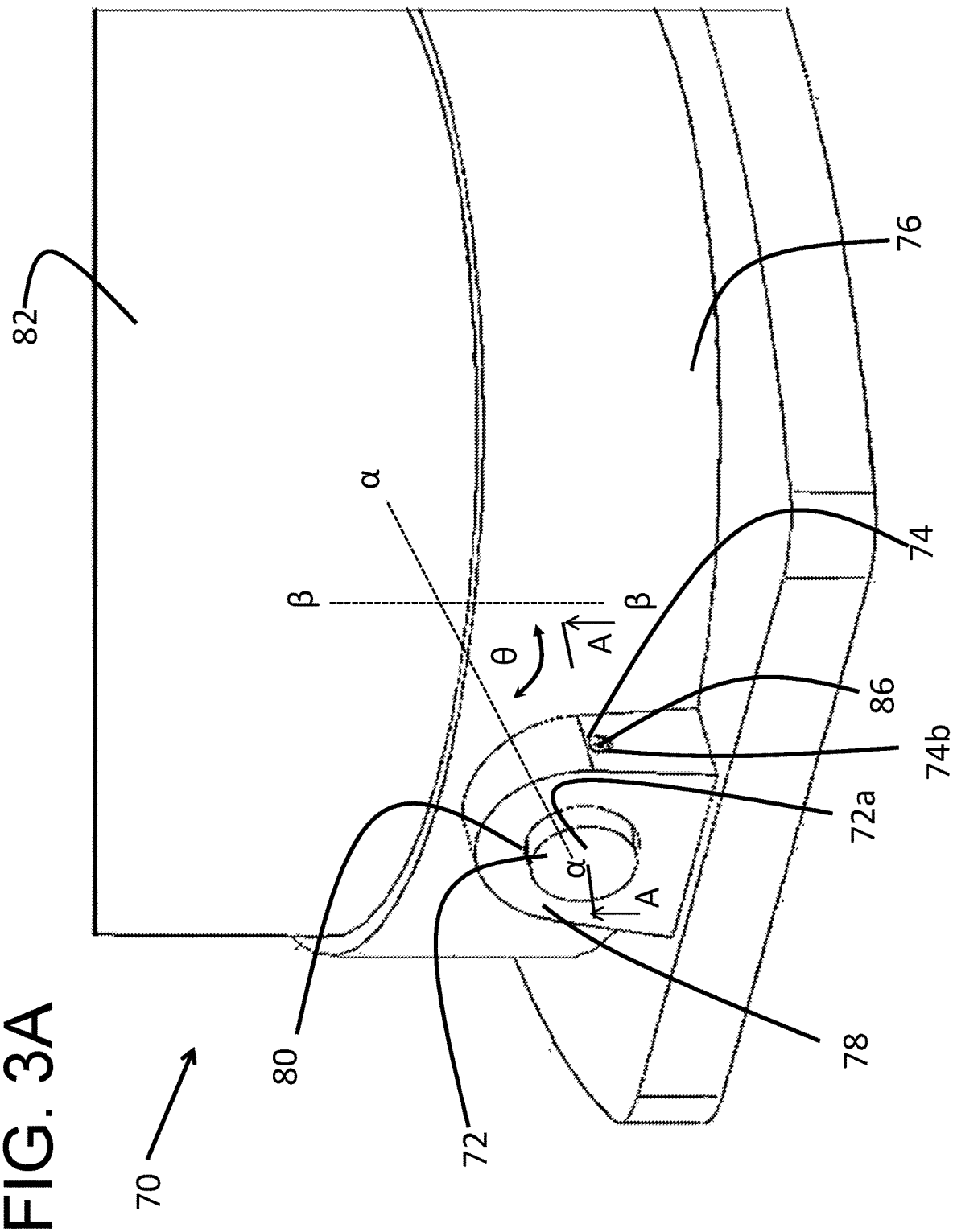

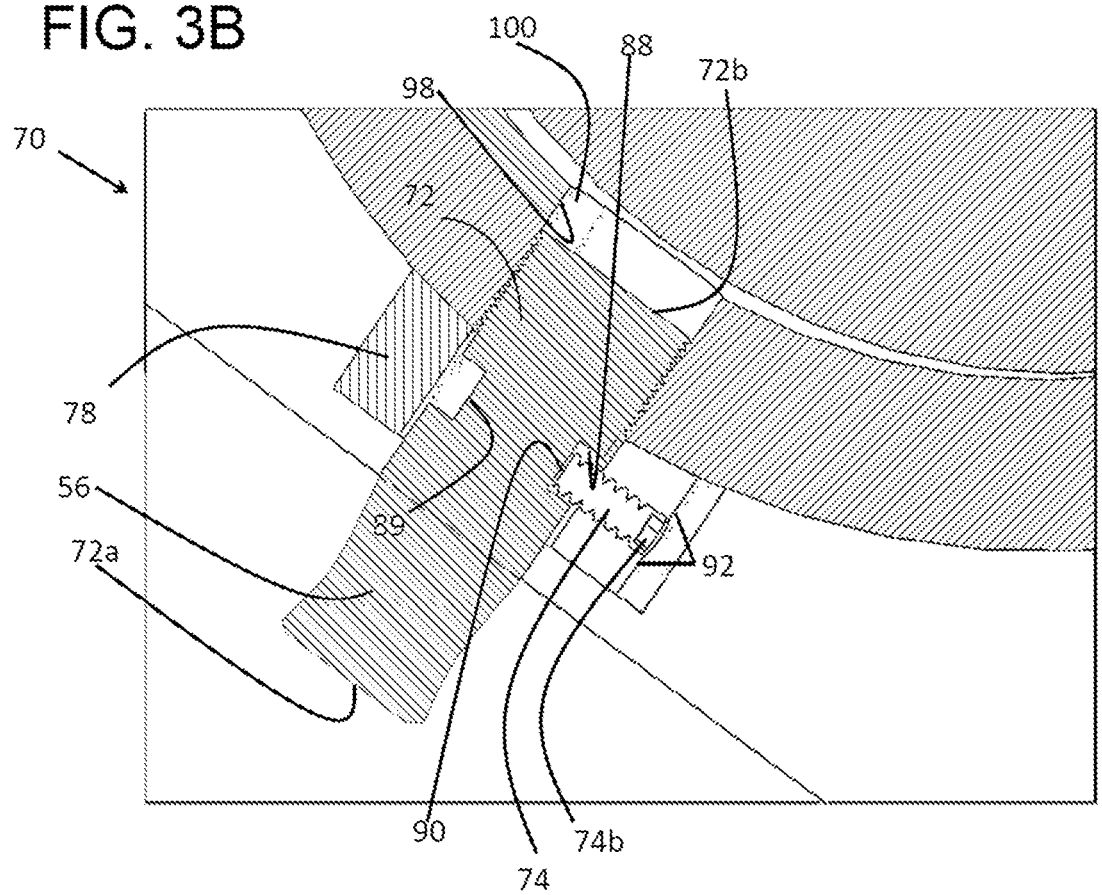

BOTTLE JACK WITH ADJUSTABLE VALVE INHIBITOR

PRIORITY

This U.S. Non-Provisional patent application claims priority and benefit as a Divisional of U.S. Utility patent application Ser. No. 15/682,711, filed on Aug. 22, 2017, currently pending, the entirety of which is incorporated by reference.

BACKGROUND OF THE INVENTION

1. Field of the Invention

This invention relates to a hydraulic bottle jack and more specifically, this invention provides improvements to a control valve for a bottle jack having an adjustable member to inhibit excessive loosening of the valve.

2. Background of the Invention

Hydraulic bottle jacks are well known in the art and utilize pressure exerted on an incompressible hydraulic fluid which in turn exerts pressure on a lifting piston. Pressure is exerted on the hydraulic fluid by a lever operated plunger, forcing the fluid from a chamber containing the plunger through a one-way valve and into a piston chamber where the fluid exerts pressure on a piston upwards. As the hydraulic fluid flows into the piston chamber, the piston is pushed higher upward. To stow the jack or reset the piston, a user opens a one-way reset valve to allow hydraulic fluid to flow back from the piston chamber to a hydraulic fluid reservoir.

The farther a user opens the one-way reset valve, the faster the hydraulic fluid flows from the piston chamber and the faster the piston lowers. In an effort to speed up the jack lowering process, users frequently continue opening the one-way valve until they unintentionally remove the valve from the jack altogether. The jack is then inoperable until repaired through replacement of the valve and any lost hydraulic fluid.

A need exists in the art for a bottle jack having a valve inhibitor. The valve inhibitor should be adjustable, with the means for adjustment readily accessible to users. The inhibitor should prevent users of the bottle jack from over loosening the valve and removing it from the jack.

SUMMARY OF INVENTION

An object of the invention is to provide a bottle jack that overcomes many of the disadvantages of the prior art.

Another object of the invention is to provide an adjustable bottle jack with a valve inhibitor. A feature of the device is that the valve inhibitor prevents a user from inadvertently removing the reset valve from a bottle jack. An advantage of the invention is that repair or replacement of a bottle jack after inadvertent removal of the valve can be avoided.

Yet another object of the present invention is to provide an adjustable bottle jack valve inhibitor. A feature of the invention is the ability for a user to adjust the valve inhibitor to customize how wide the inhibited valve can be opened or how many times it can be turned. An advantage of the invention is that the speed of lowering the jack can be customized with the reset valve without concern of removal of the bottle jack valve.

Still, yet another object of the present invention is to provide a one piece inhibitor for a bottle jack valve to provide facile engineering. A feature of the invention is the use of a single component that can be set to inhibit the turning of the bottle jack valve. An advantage of the invention is facile assembly of the inhibition system. A further advantage is that the inhibitor only requires a single aperture in bottle jack valve housing, further facilitating facile engineering. Still yet another advantage of the present invention is the visibility of the inhibitor through the casing of the bottle jack featuring the present invention. With the inhibitor visible to a user of the jack, the user can easily adjust the inhibitor without removing the jack's reset valve or portions of the jack's case.

Briefly, the invention provides A threaded member received into a case, the threaded member comprising an elongated main body with a threaded section defined on a distal end and a knob on a proximal end; wherein said threaded section is received into a corresponding threaded receptacle in said case and wherein said knob protrudes outside an exterior surface of said case upon full insertion of said threaded member; a pair of seals disposed on the threaded member between the distal end and the proximal end; and a longitudinally extending surface of the threaded member defining a substantially flat area said area disposed between said knob and said pair of seals; wherein a threaded stopping screw is received in said flat area and said threaded stopping screw transversely extending through the case in a single opening, through a threaded aperture so as to prevent extraction of the threaded member by applying a force against a portion of the threaded member once the threaded member is moved a predetermined number of turns.

The invention also provides a method for inhibiting the turning of a valve comprising the steps of installing a threaded portion of a valve in a first threaded aperture through a valve casing, the valve then being in a first position, wherein the first threaded aperture receives the threads of the threaded portion of the valve; and threading a screw through a second threaded aperture in an exterior of the valve casing, wherein the screw, once installed, is disposed in a position to come into direct contact with the valve after a predetermined number of turns to place the valve into a second position.

BRIEF DESCRIPTION OF DRAWING

The invention together with the above and other objects and advantages will be best understood from the following detailed description of the preferred embodiment of the invention shown in the accompanying drawings, wherein:

FIG. 3A is a perspective view a jack using the invented valve and valve inhibitor, in accordance with the features of the present invention; and FIG. 3B is a cross-sectional view of the FIG. 3A jack along the line A-A, in accordance with the features of the present invention.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1A:
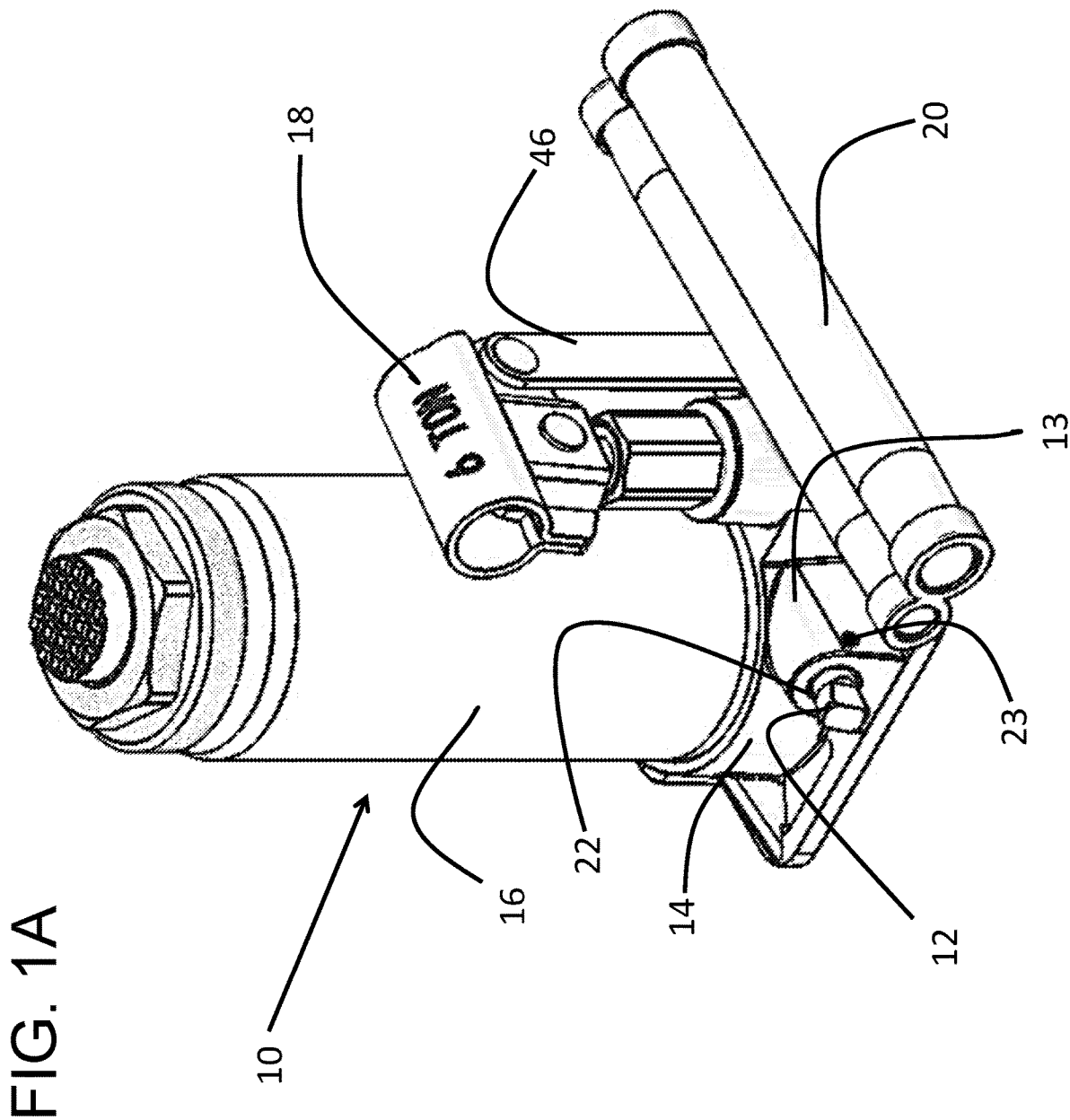
FIG. 1A depicts a perspective view of a bottle jack employing the invented valve and valve inhibitor, in accordance with the features of the present invention.

As shown in FIG. 1A, the invention provides a bottle jack 10 having an exterior valve 12 used to lower the jack 10 when raised, that valve 12 housed in a valve housing 13 defined by the base 14 of the jack. The base 14 supports a jack assembly 16 rising vertically from the base 14. Also rising vertically from the base 14, is the pump assembly 18. The handle 20 used to operate the pump assembly 18 is shown disassembled and placed proximate to the jack 10. The exterior valve 12 extends laterally from the base 14, with the portion of the base 14 housing the valve 12 featuring an aperture 22 configured to receive the invented valve inhibitor 23.

Figure 1B:
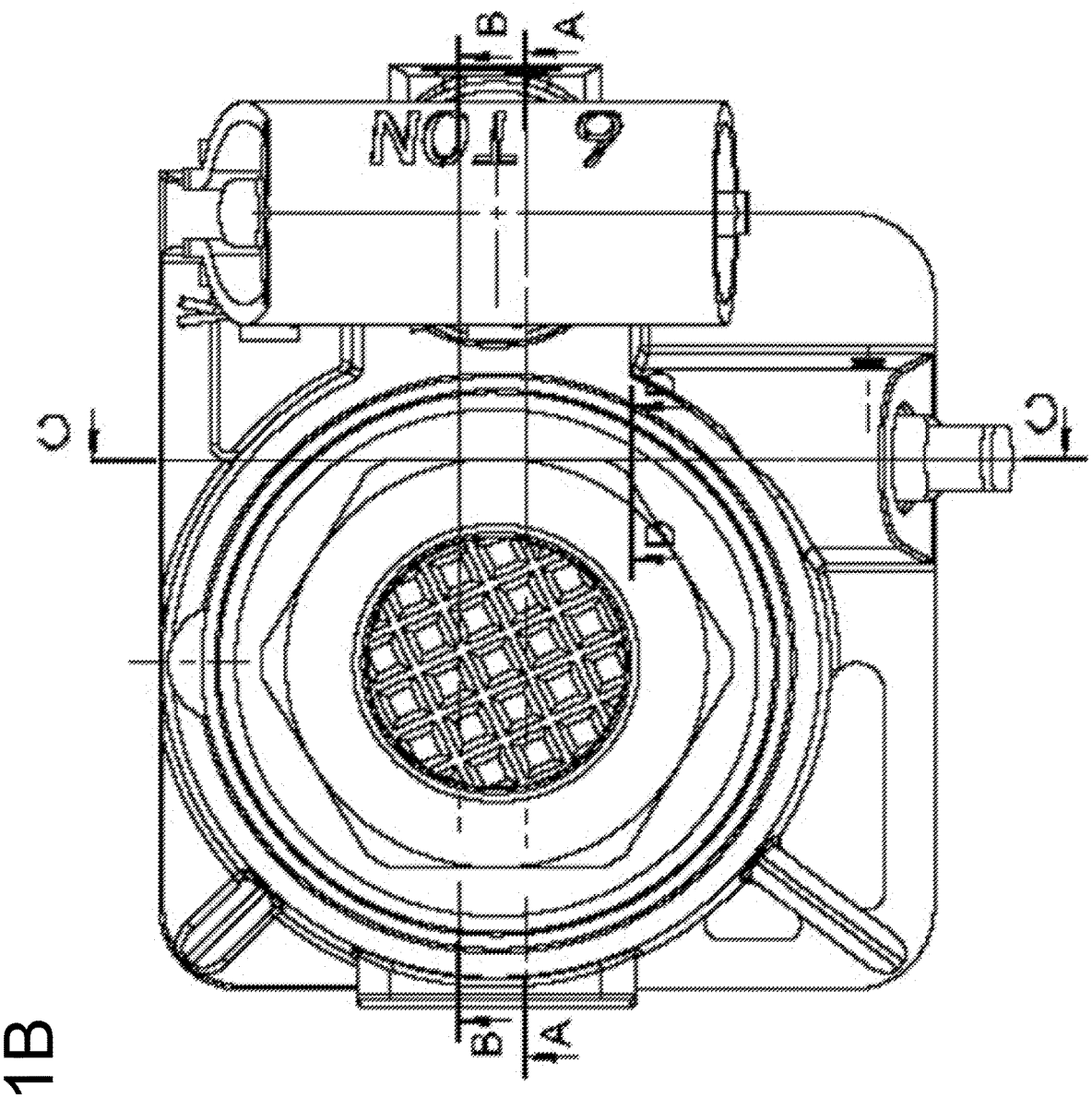
FIG. 1B is a top view of the bottle jack of FIG. 1A, in accordance with the features of the present invention.
Figure 1C:
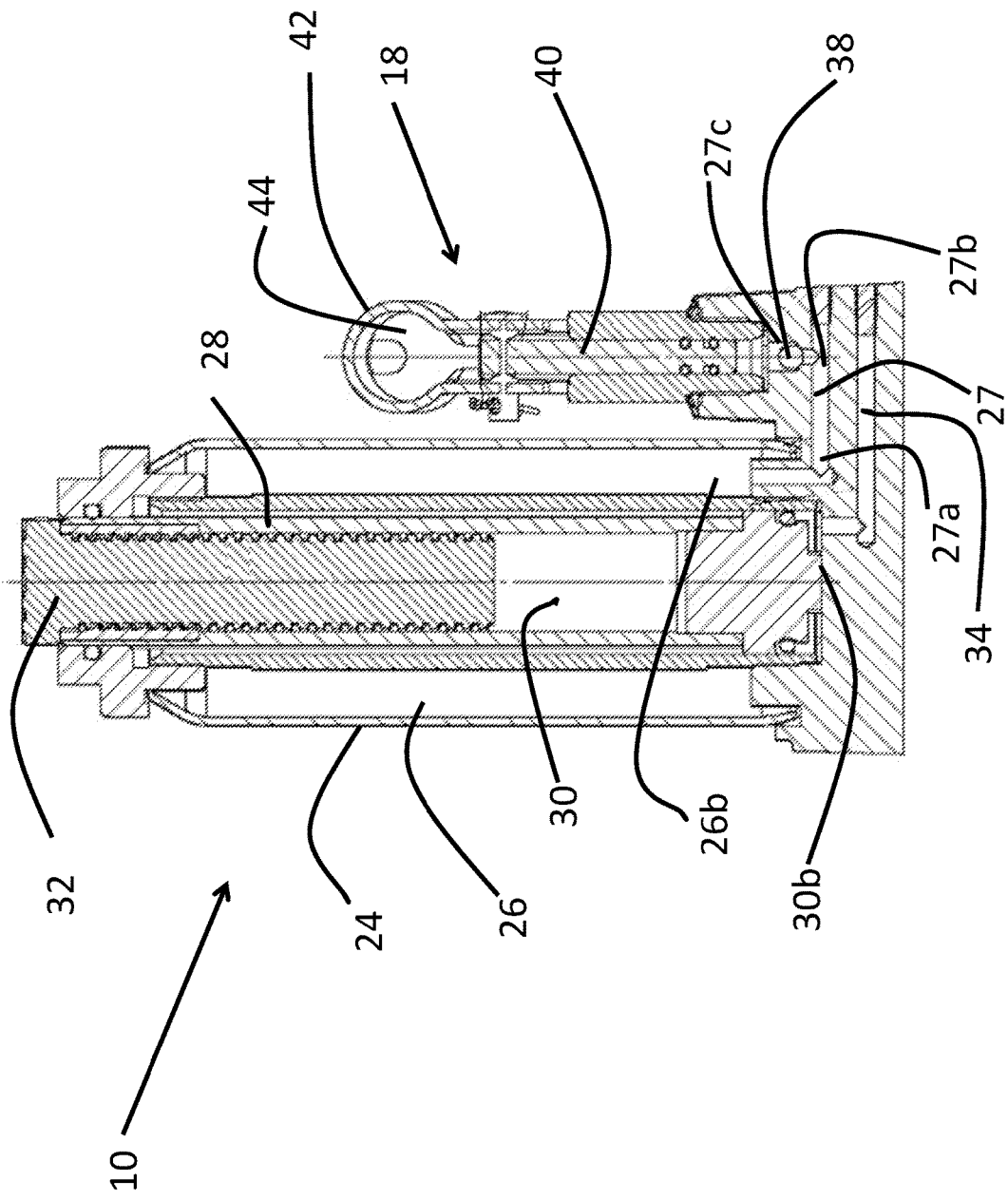
FIG. 1C is a cross-sectional view of the FIG. 1A jack down the line A-A shown in FIG. 1B, in accordance with the features of the present invention.

Referring now to FIG. 1C, the bottle jack 10 features a substantially cylindrical casing 24 that houses a coaxially disposed hydraulic fluid reservoir 26, a depending end of the fluid reservoir 26b in fluid communication with a draw conduit 27 having a first end 27a and a second end 27b. An interior housing 28 is disposed coaxially within the fluid reservoir 26. The interior housing 28 forms a piston chamber 30 which coaxially receives a piston rod 32, a depending end 30b of the piston chamber in fluid communication with a pressurizing conduit 34.

The hydraulic fluid draw conduit 27 extends from a first end 27a in communication with the fluid reservoir 26 to a second end 27b which is in fluid communication with the pump assembly 18. At its terminal portion 27c, the hydraulic fluid draw conduit extends vertically toward and into communication with the pump assembly 18. Said terminal portion 27c flares from a smaller first diameter to a larger diameter at a point intermediate the second end 27b of the supply conduit and the pump assembly 18. A spring biased ball valve 38 (spring not depicted) is seated at the point where the diameter of the terminal portion 27c of the supply conduit expands. The ball valve is biased so that when its spring is compressed, the ball is seated at the flare point of the terminal portion 27c of the supply conduit. In its default, extended position, the ball is raised by its spring toward the pump assembly 18 and unseated from the flare point.

As shown in FIGS. 1A-E, the pump assembly 18 extends vertically from the base 14 of the jack 10 and contains a plunger 40. The pump assembly 18 terminates in a connector 42 defining an aperture 44 configured to reversibly receive the handle 20 (shown in two parts in FIG. 1A). The pump assembly 18 features an actuator 46 pivotally mounted to both the base 14 and connector 42 of the jack 10.

Figure 1D:
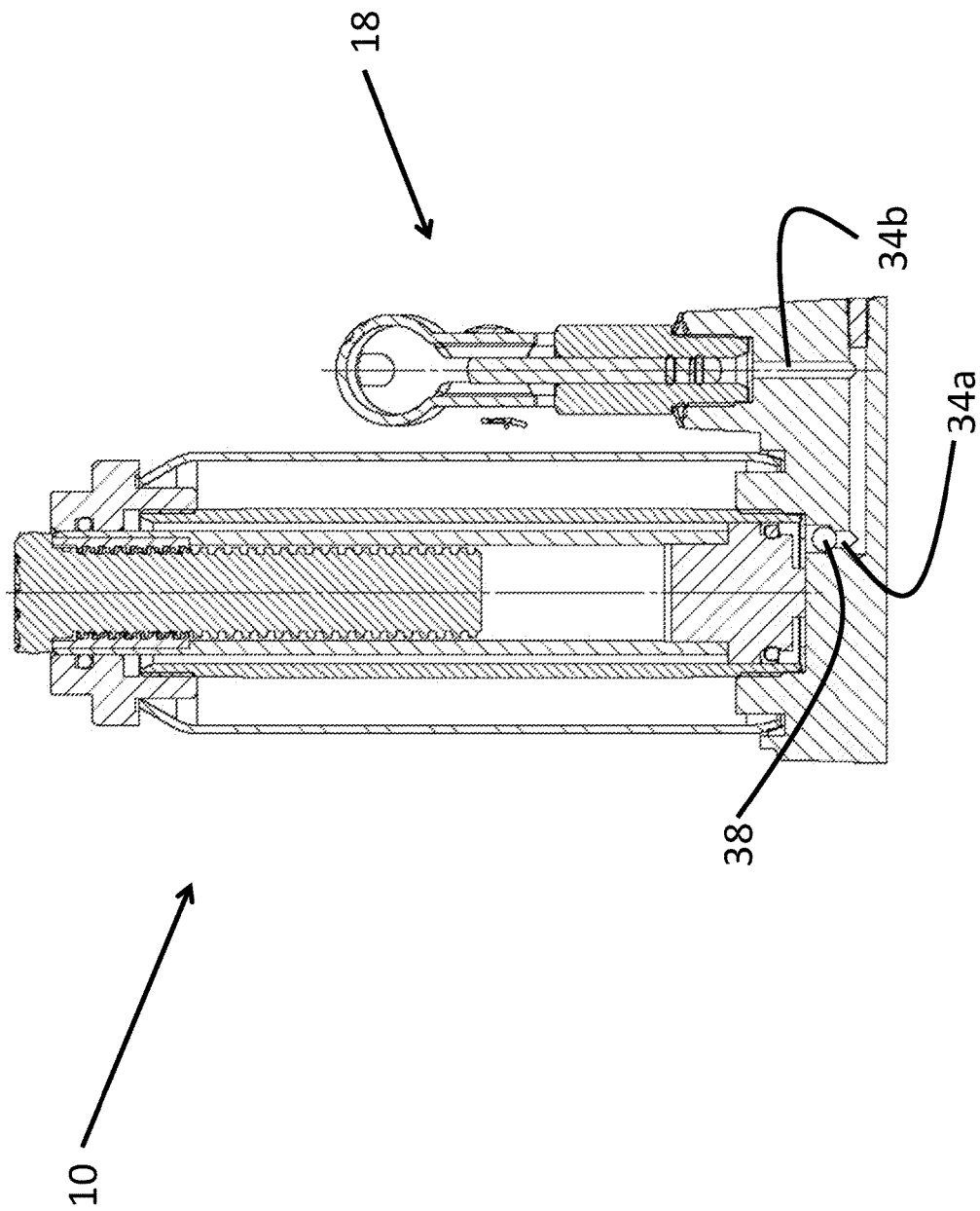
FIG. 1D is a cross-sectional view of the FIG. 1A jack down the line B-B shown in FIG. 1B, in accordance with the features of the present invention.

Looking to FIG. 1D, the pump assembly 18 is also in fluid communication with a second end 34a of the pressurizing conduit, the conduit extending between its first end 34a proximal to the piston chamber 30 and its second end 34b proximal to the pump assembly 18. The first end of the pressurizing conduit 34a features a flare in diameter of the terminal portion similar to the terminal portion of the supply conduit 27c as shown in FIG. 1C and similarly features a spring biased ball valve 38.

Figure 1E:
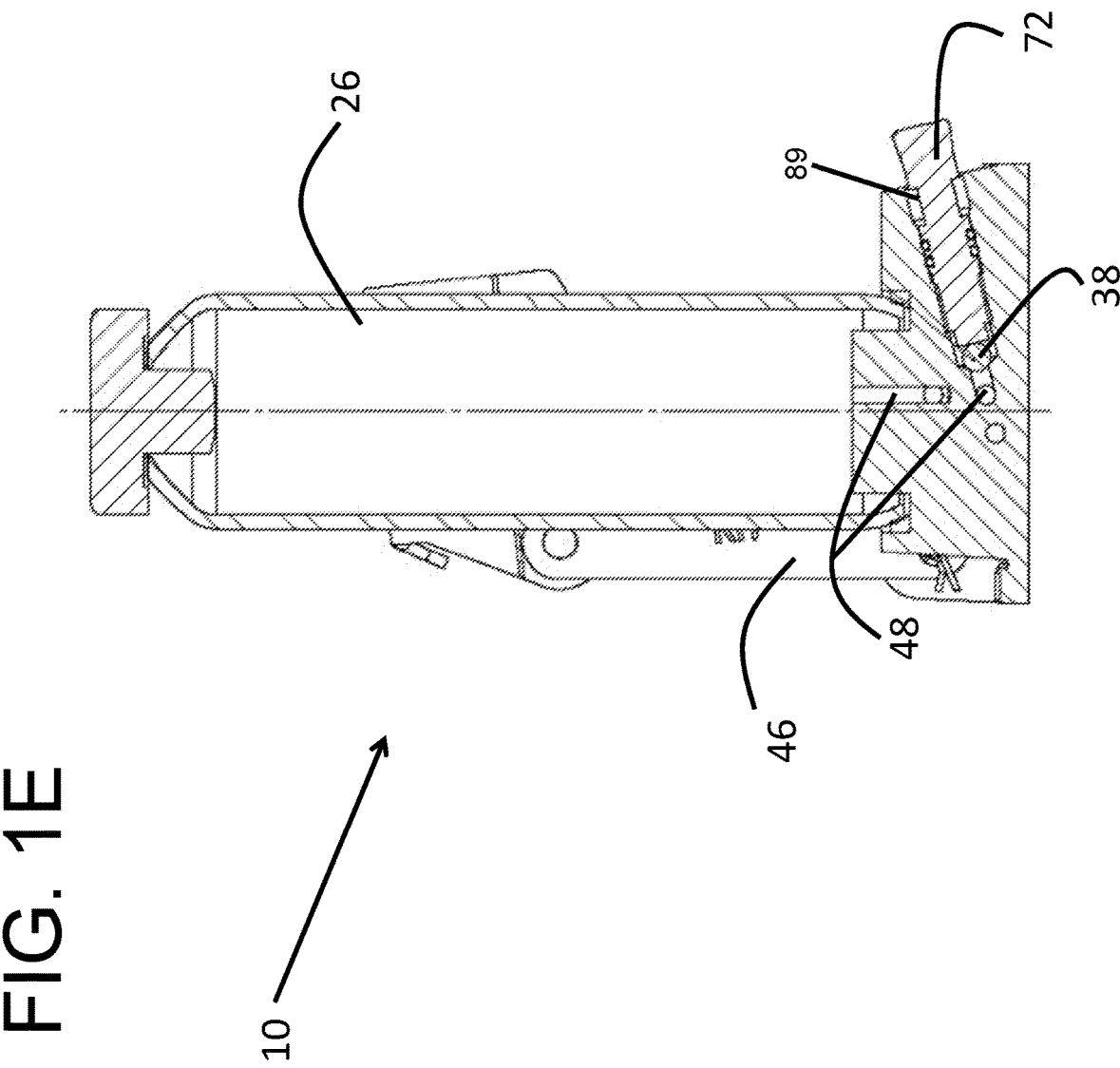
FIG. 1E is a cross-sectional view of the FIG. 1A jack down the line C-C shown in FIG. 1B, in accordance with the features of the present invention.

FIG. 1E depicts a cross section of the exemplary bottle jack of FIG. 1B featuring the invented valve 72 along the line C-C. FIG. 1E depicts portions of the hydraulic fluid return conduit 48 which places the piston chamber 30 (not shown in FIG. 1E) and hydraulic fluid reservoir 26 in fluid communication. Also shown the invented valve 72 inserted into an aperture in the base 12, the valve having threads (shown in FIG. 2) matably engaged with threads on the aperture (shown in FIG. 3B). The valve 72 is in contact with a spring biased ball valve 38 that is seated in the hydraulic fluid return conduit 48 such that fluid is prevented from flowing.

Figure 1F:
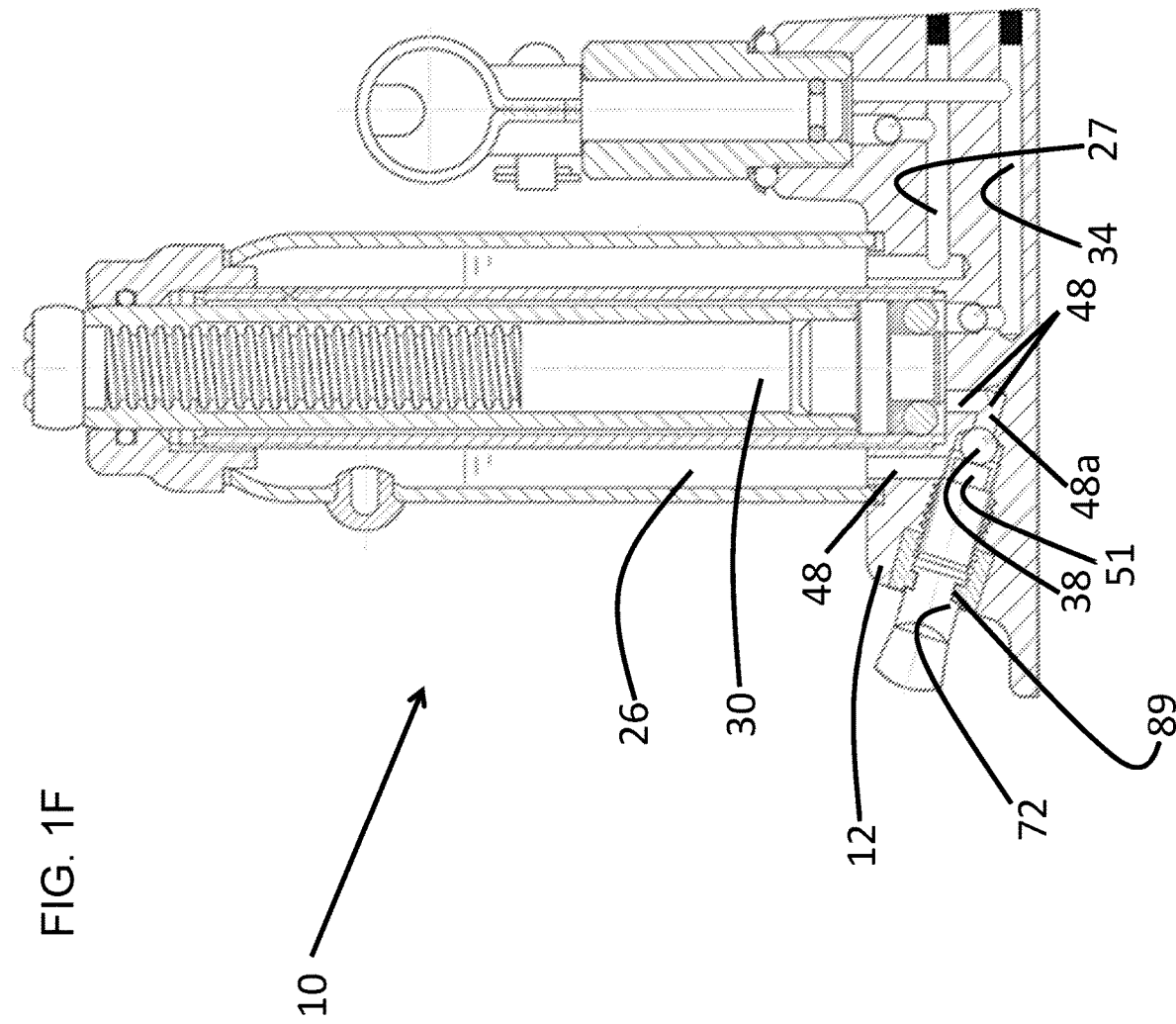
FIG. 1F is a cutaway view of the interior of the FIG. 1A jack in accordance with the features of the present invention.

FIG. 1F depicts a cutaway view of the interior of the exemplary jack 10 discussed. As shown in FIG. 1F, the hydraulic fluid return conduit 48 extends between the piston chamber 30 and hydraulic fluid reservoir 26. The valve 72 is threaded into an aperture in the base 12, its terminal portion 51 in contact with a spring biased ball valve 38. When compressed by the valve 72, the spring-biased ball valve is seated in a medial portion 48a of the hydraulic fluid return conduit 48 such that the piston chamber 30 and hydraulic fluid reservoir 26 are not in fluid communication. When the valve 72 is opened, as discussed infra, the ball valve 38 is unseated from the return conduit 48 and places the piston chamber 30 and hydraulic fluid reservoir 26 in fluid communication.

Detail of Jack Use

In use, a user inserts the handle 20 into the connector 42 of the pump assembly 18 and actuates the actuator 46 up and down. When the handle 20 is raised, the actuator 46 causes the plunger 40 to rise which opens the ball valve 28 between the supply conduit 27 and the pump assembly 18, drawing hydraulic fluid from the hydraulic fluid reservoir 26 into the pump assembly 18. When the handle 20 is subsequently lowered, it drives the plunger 40 downward. The downward force of the plunger 40 closes the ball valve of the supply conduit 27, forces hydraulic fluid through the pressurizing conduit 34, the fluid in turn pushing open the ball valve on the pressurizing conduit 34 and flowing into the piston chamber 30. As the jack is actuated subsequently, more hydraulic fluid flows into the piston chamber 30, each addition of hydraulic fluid into the piston chamber 30 causes the piston rod 32 to rise and lift a body placed on top of the piston rod 32.

When it is time to lower the jack, the user partially unscrews the invented valve 12 which opens the ball valve 38 in the hydraulic fluid return conduit, placing the piston chamber 30 and the hydraulic fluid reservoir 26 into fluid communication. With the reservoir and piston chamber in communication, the piston 32 falls and forces fluid from the piston chamber 30 into the hydraulic fluid reservoir. A user can determine how quickly the piston falls and, in turn, how quickly the hydraulic fluid flows back to its reservoir by adjusting the position of the ball valve within the return conduit. If a user opens the valve farther, the ball valve 38 moves farther out of the return conduit causing faster fluid return and faster resetting of the piston.

As discussed, supra, a common issue with hydraulic jacks is users turning the release valve too many times until the valve is removed from the jack. When the valve is removed, hydraulic fluid will leak from the jack and render the jack unusable until both the valve and hydraulic fluid are replaced. The inventors have found that the invented valve and valve inhibitor prevent this problem.

Valve and Inhibitor Detail

Figure 2:
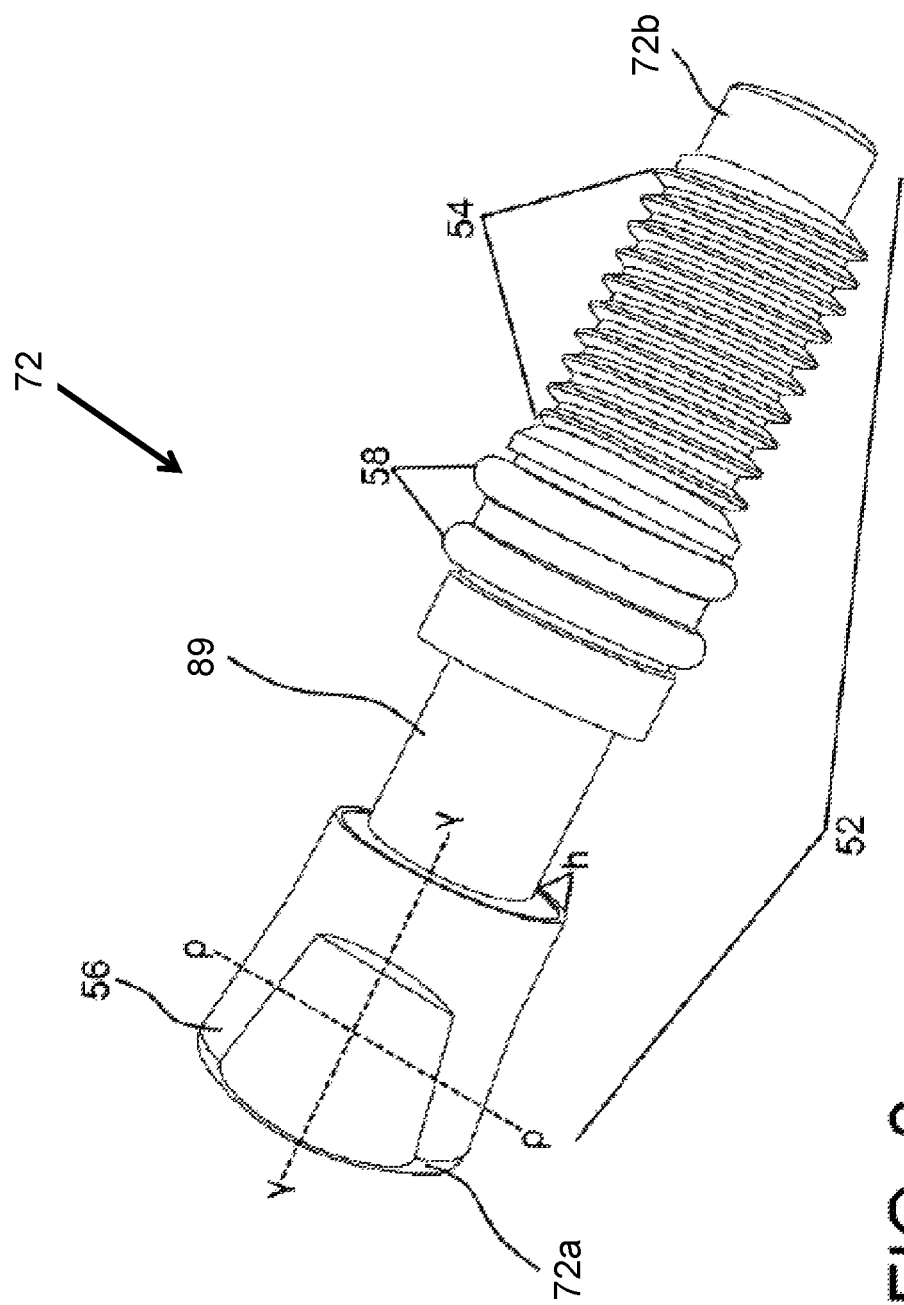
FIG. 2 is a detail view of the invented valve, in accordance with the features of the present invention.

FIG. 2 is a detailed view of the invented valve 72. The valve 72 comprises an elongated main body 52 having a first end 72b and a second end 72a. Said valve features a threaded section 54 defined on its first end 72b and a knob 56 on its second end 72a wherein a pair of seals 58 are disposed on the valve member intermediate its first 72b and second ends 72a. In an embodiment (not shown), the two seals 58 are a single seal while in the embodiment, the seals 58 comprise a plurality of seals. Also intermediate the first and second ends of the valve is a substantially flat area 89, that flat area having a smaller longitudinal diameter than the longitudinal diameter of the valve 72 at its first 72b and second 72a ends.

The proportions and geometries of the invented valve 72 shown in FIG. 2 are meant to be exemplary and not limiting. For example, the flat area 89 can be closer in diameter to the rest of the valve 72 than shown in FIG. 2, and making the flat area 89 wider in diameter may be desirable when designing a limiting member, discussed infra, corresponding with the valve. Similarly, the diameter of the second end 72a of the valve is shown to taper down in diameter. In an embodiment, the second end 72a of the valve including its threads is the same diameter as the first end 72b of the valve.

The valve of FIG. 2 is shown and described as having a second end 72a defining a knob. The first end 72b, however, can be manufactured into any shape suitable for desired use of the valve. In an embodiment, the second end 72a of the valve defines a cylinder with radially spaced ridges to accommodate the fingers of a user when turning the valve 72. In an embodiment, the knob is a handwheel.

The valve can be made in any size to accommodate use in various hydraulic systems, from use in small hydraulic jacks to use in larger industrial hydraulic systems. In order to suit applications of various scales, the valve and its components can be made from suitable materials to accommodate varying sizes and pressures of hydraulic systems using the invented valve. For example, the body of the valve is made from suitably rigid, form-holding materials such as metals, polymers, wood, and combinations thereof. Further, depending on the intended use of the invented valve and the pressure used in the intended process, the valve body can be hollow or solid. The seals can be made from any high-friction material, an exemplary material being rubber.

In an embodiment, such as the one shown in FIG. 2, the knob 56 on the valve 72 is between approximately 10 mm to approximately 15 mm long along its longitudinal axis γ, typically approximately 12 mm. The knob 56 is approximately 5 mm to approximately 10 mm wide along its latitudinal axis ρ, typically approximately 7.5 mm wide. The first end of the valve 72b opposite the knob is between approximately 5 mm to approximately 10 mm in diameter, typically approximately 6.8 mm with a length between approximately 2 mm to approximately 5 mm, typically 3.5 mm long. And, the recessed portion 89 of the valve 50 is between approximately 5 mm and approximately 10 mm long, typically 8 mm long with a diameter between approximately 5 mm and approximately 10 mm, typically 7.5 mm.

These dimensions describe an exemplary valve, the invented valve not limited to these exemplary ranges.

FIG. 3A depicts a perspective view of the exterior of a bottle jack 70 using the invented valve 72 and valve inhibitor 74. A portion of the base 76 of the jack 70 defines a valve housing 78. The valve housing 78 is shown in this figure as 78 as ovular to coincide with the circular shape of the distal end 72a of the valve shown in FIG. 3 but can be any shape. The distal end 72a of the valve, shown as circular though it can be any shape as discussed, supra, protrudes from an aperture 80 in the base 76. As shown in FIG. 1E, the valve 72 extends medially from the jack assembly 82 at an angle θ between the longitudinal axis of the valve a and the longitudinal axis of the jack β. θ is preferably between approximately 45° and approximately 80° and typically approximately 76°. Another aperture (not shown) traverses through the valve housing 78, the aperture receiving a valve inhibitor 74, the valve inhibitor entering the valve housing along the latitudinal axis of the valve.

The distal end of the valve inhibitor 74b is accessible and can protrude slightly from the aperture in the valve housing 78 in which the valve inhibitor is disposed. In FIGS. 3A-B, the distal end 74b of the valve inhibitor is shown featuring a hexagonally shaped depression 86 to receive the working end of an Allen wrench. The hexagonal shaped depression 86 is meant to be exemplary and not limiting. In alternative embodiments, the hexagonal shaped depression can be replaced with tooling so that the valve inhibitor 74 can be manipulated with a Phillip's head screwdriver, a flat-head screwdriver, a star key, or other tools designed to turn threaded implements. The valve inhibitor can be manufactured to be any length and diameter such that the size of the aperture in the valve housing and the height h of the flat recess (shown in FIG. 2) in the valve, can be accommodated. In an exemplary embodiment, the length represented by h is between approximately 1 mm and approximately 3 mm, typically 1.6 mm.

A salient feature of the invention is the single aperture in the valve housing 78. The single aperture needed to reversibly install the valve inhibitor provides facile engineering that can be retroactively applied to existing hydraulic jacks. Another important feature of the invention demonstrated in FIG. 3A is the ability of a user to access and adjust the valve inhibitor 74 from the exterior of the jack 70 using only consumer grade tools. As such, a user can install, remove, or adjust the invented valve inhibitor without removing any part of the casing of a jack using the invented valve inhibitor or remove the valve being inhibited.

FIG. 3B is a cross-sectional view of the jack 70 of FIG. 3A along line A-A. As shown in this figure, when threaded far enough into the valve housing 78, the valve inhibitor 74 protrudes into the void between the first 72a and second 72b ends of the valve. While in this position, the valve 72 can only be opened a certain amount or turned a certain number of times until one of the laterally extending walls 88 forming the flat recess 89 of the valve contacts the valve inhibitor. Once the valve 72 contacts the valve inhibitor 74, the valve cannot be further opened or turned, thus preventing the valve from being removed from the jack. Similarly, the valve inhibitor can be inserted into the valve to prevent the valve from being overly tightened or overly nested within the jack.

In FIG. 3B, the medially facing end 90 of the valve inhibitor 74 is not shown in contact with the flat recess 89 in the valve 72. This demonstrates that the invented valve inhibitor 74 does not have to make contact with the flat recess 89 of the valve inhibitor to function, though such a position is contemplated for optimal valve inhibition. To inhibit the valve 72 from being removed or opened too far, any length of the valve inhibitor just has to be positioned between the medially extending walls 88 defining the flat recess 89.

A salient feature of the invention is the direct inhibition of the invented valve with the invented valve inhibitor. When a user wants to inhibit the invented valve, invented valve inhibitor is inserted into a position to make direct contact with the invented valve. Such direct valve inhibition avoids the complicated and multiple component valve inhibitors of the prior art.

In the embodiment featured in FIGS. 3A-B, when the valve 72 is installed in the valve housing 78 of the jack 70, the flat recess 89 immediately opposes the aperture 92 through which the valve inhibitor 74 is installed. When the valve inhibitor is removably installed in the valve housing 78, there is then a predetermined number of turns of the valve in either direction before the valve inhibitor prevents further turns. This predetermined number of turns is provided automatically by the size of the threads provided on the valve inhibitor 74 and the interior walls 98 of the aperture 100 receiving the valve. The larger the threads, the fewer turns that will be permitted. The smaller the threads, the more turns that will be permitted. In an exemplary embodiment, the threads disposed on the valve 72 are between approximately 2 mm and approximately 5 mm apart, typically 1.25 mm apart. A fully installed valve 72 that was previously removable from its jack 70 after eight turns was prevented from being turned more than approximately 2.5 turns using the invented valve with the described threads.

The size of the threads can range in size so that a fully installed valve 72 can be turned between approximately one half of a complete turn to four complete turns of the threaded member before the valve contacts the inhibitor and can be turned no further. The predetermined number of turns permitted by the valve inhibitor is preferably between one half complete turns and two complete turns and typically between one half complete turns and one and a half complete turns. When the invented valve inhibitor prevents further rotation of the invented valve, a user can manually override the inhibitor by removing it. Further, the invented valve can be retightened without removing or adjusting the invented valve inhibitor.

The size of the threads disposed on the interior of the aperture 96 on the jack housing 78 are fixed when the jack 70 is produced, thereby fixing the required size of the threads on the valve. Thread size, however, is not the only way to predetermine the number of turns of the valve permitted before inhibited by the valve inhibitor. The longitudinal distance defining the flat recess on the valve also predetermines how many turns will be permitted of the valve before inhibition. In the instant invention, new valves having different longitudinal distances defining the flat recess can be produced and installed after a user already possesses a jack using the instant invention In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A method for inhibiting the turning of a valve comprising:
   providing a case having a threaded receptacle;
   providing a threaded member having a cylindrical main body extending along a longitudinal axis with two ends; a threaded section on a first end; a knob on a second end; wherein a plurality of seals are disposed between the first end and the second end, and an annular depression coaxial with the cylindrical main body disposed between the knob and the seals;
   providing a stopping screw to transversely extend through the case in a screw opening;
   receiving said threaded member into said threaded receptacle such that the knob protrudes outside of an exterior surface of said case;
   installing the stopping screw to apply a force against the threaded member;
   preventing removal of the threaded member by the stopping screw force once the threaded member rotates a predetermined number of times.

2. The method of claim 1 wherein the annular depression receives a portion of the screw when the screw is threaded through the second threaded aperture.

3. The method of claim 1 further comprising resetting the valve into its first position without removing the stopping screw.

4. The method of claim 1 wherein the predetermined number of turns is between one and three.

\* \* \* \* \*